Oct. 13, 1942.  B. J. DENNISON ET AL  2,298,874
LAMINATED GLASS AND MOUNTING THEREFOR
Filed Dec. 28, 1940

Inventor
B. J. DENNISON and
FRANK F. PAINTER

By  Olew E. Bee
Attorney

Patented Oct. 13, 1942

2,298,874

UNITED STATES PATENT OFFICE 2,298,874.

LAMINATED GLASS AND MOUNTING THEREFOR

Brook J. Dennison, Aspinwall, and Frank F. Painter, Tarentum, Pa., assignors to Pittsburgh Plate Glass Company, a corporation of Pennsylvania Application December 28, 1940, Serial No. 372,106

3 Claims. (Cl. 20—56)

The present invention relates to laminated glass and more particularly to a laminated glass which has an integral part thereof a projecting metal border.

One object of the invention is the provision of a laminated glass which includes a metal border designed to facilitate mounting of the laminated glass.

A second object of the invention is to provide a flexible mounting for laminated glass which will prevent development of excessive stresses and strains in the glass laminae.

Other objects and advantages of our invention will become more apparent from the following detailed description of a preferred embodiment thereof.

In general, plates of laminated glass are positioned in wall structures in such manner that the surrounding frame overlies the edges of the glass laminae. Despite the use of cushioning strips interposed between the glass and the frame, it is quite common to have localized areas of strain in the glass laminae created resulting in a fracture thereof. This effect, due largely to improperly fitted frames, is magnified considerably, when pressure differentials between outside and inside atmospheres cause a distention of the laminated plate.

Briefly stated, the present invention contemplates the formation of an integral metal border extending beyond the edges of the glass sheets of a laminated glass and the use of this metal border in mounting the laminated glass.

Figure 1:
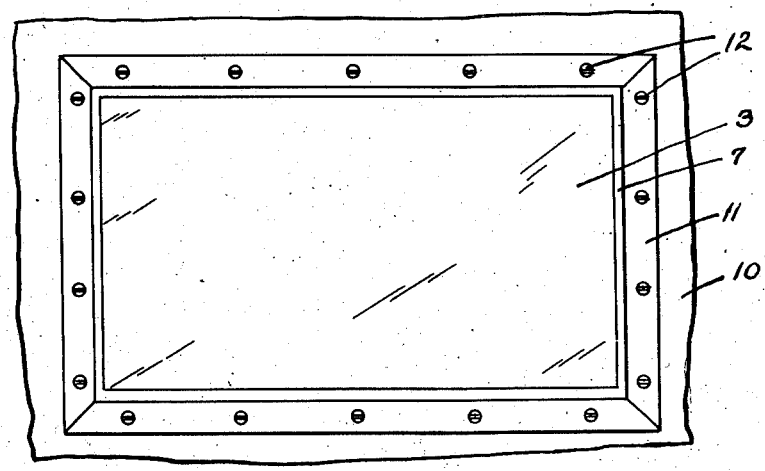
Figure 2:
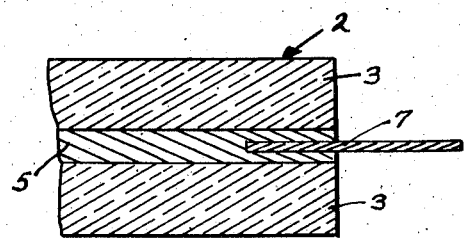

In the drawing, Figure 1 is a plan view of a laminated glass embodying the features of our invention and mounted in a wall structure, and Figure 2 is a fragmentary vertical sectional view of the laminated glass only.

Referring to the drawing, a laminated plate 2 comprises sheets 3 of glass united by an interposed layer 5 of plastic material, such as a vinyl butyral resin. Strips 7 of a flexible metal are inserted in and secured by the plastic layer 5 to form an integral part of the plate 2. The strips 7 are of sufficient width to lie between the glass sheets 3 for a short distance from the edges thereof and also extend beyond the edges of the glass sheets to form a border. The corners of the strips may be welded or otherwise joined so that the border will be continuous around the entire plate.

The plate 2 is mounted in a wall structure 10 by means of a frame 11, bolts 12, or other means, securing the metal border 7 to the wall structure 10. The frame 11 is of such dimensions that it will be spaced from the glass laminae 3.

It will be seen, therefore, that there is provided a resilient mounting for the plate 2. The metal border 7 permits movement of the plate 2 and there is no pressure exerted upon the faces of the glass laminae 3.

What we claim is:

1. In a closure structure for an opening in a wall, an interlayer of organic plastic, glass plates bonded on opposite sides of the interlayer and defining therewith a laminated unit, and flexible sheet metal in strip form running longitudinally of border portions of the laminated unit and anchored in the plastic interlayer between the glass plates adjacent their edges, said sheet metal extending beyond the edges of the glass plates constituting flexible connecting elements for mounting the laminated unit.

2. In a closure structure for an opening in a wall, an interlayer of organic plastic, glass plates bonded on opposite sides of the interlayer and defining therewith a laminated unit, and flexible sheet metal in strip form running longitudinally of border portions of the laminated unit and anchored in the plastic interlayer between the glass plates adjacent their edges, said interlayer holding the sheet metal in cushioned relation free from contact with the glass plates, and said sheet metal extending beyond the edges of the glass plates constituting flexible connecting elements for mounting the laminated unit.

3. In a closure structure for an opening in a wall including supporting frame members surrounding the opening, an interlayer of organic plastic, glass plates bonded on opposite sides of the interlayer and defining therewith a laminated unit, and flexible sheet metal in strip form defining a substantially endless frame surrounding the border portions of the laminated unit, the inner edges of the endless sheet metal frame being anchored in the plastic interlayer between the glass plates adjacent their marginal portions and the outer edges of the sheet metal frame being connected to said supporting frame at locations spaced outwardly from the edges of the glass plates.

BROOK J. DENNISON.
FRANK F. PAINTER.